United States Patent Office 2,878,260
Patented Mar. 17, 1959

2,878,260

PREPARATION OF 1,2-DITOLYLETHANE

Herman S. Bloch, Skokie, and Edward M. Geiser, Downers Grove, Ill., assignors to Universal Oil Products Company, Des Plaines, Ill., a corporation of Delaware No Drawing. Application November 14, 1955
Serial No. 546,824

5 Claims. (Cl. 260—668)

This invention relates to a process for preparing a diaryl alkane and particularly to a method for preparing a 1,2-diarylethane. More particularly the invention relates to a process for preparing p,p'-1,2-ditolylethane.

The increased use of terephthalic acid as an intermediate in the preparation of synthetic fibers of the glycol-terephthalic type, such as those known in the trade as Dacron, Terylene, etc., has increased the demand for para-xylene from which the terephthalic acid is prepared. Heretofore the separation of para-xylene from its ortho- and meta-isomers has been relatively expensive, due to difficulties encountered in the process involving the separation of the aforementioned isomers. For example, one method of preparing para-xylene from mixtures of ethylbenzene and isomeric xylenes is to subject the mixture o-xylene, m-xylene, p-xylene and ethylbenzene to fractional distillation. However, inasmuch as para-xylene, meta-xylene and ethylbenzene all boil with a 3° C. range of each other, separation into the various components by fractional distillation is rather difficult to accomplish.

One method of operation is to distill out the o-xylene which has a boiling point of approximately 5–6° C. above that of the other 3 components of the mixture. The para- and meta-xylene along with the ethylbenzene will then be separated into several fractions and para-xylene may then be separated out by crystallization from cuts containing the highest percentage.

Another method of separating the para-xylene from the unwanted isomers is to displace the eutectic compositions of para- and meta-xylene by the addition of a co-crystallizing agent such as carbon tetrachloride followed by cooling, the para-xylene and carbon tetrachloride thereby separating out of the mixture, and thereafter recovering said para-xylene by fractional distillation of the para-xylene-carbon tetrachloride mixture.

Still another method of recovering para-xylene is to partially sulfonate the mixture, separate the unsulfonated layer from the reaction mixture and crystallize the para-xylene from the mixture by lowering the temperature.

It can readily be seen from the above description that the process for obtaining relatively pure para-xylene for the manufacture of terephthalic acid involves many steps which, as hereinbefore set forth, are relatively difficult and expensive to accomplish.

It is therefore an object of this invention to provide a relatively inexpensive and novel process for obtaining diaryl-substituted alkanes which may be converted to desired aryl dicarboxylic acids.

A further object of this invention is to provide a process for obtaining 1,2-diarylethanes by condensing an aromatic hydrocarbon with ethylene chlorhydrin.

A specific object of this invention is to provide a process for obtaining p,p'-1,2-ditolylethane by condensing toluene with ethylene chlorhydrin.

One embodiment of this invention is found in a process for the preparation of 1,2-ditolylethane which comprises condensing toluene with ethylene chlorhydrin in the presence of an acidic condensation catalyst, separating the resultant condensation product, further condensing said product with toluene in the presence of a Friedel-Crafts type catalyst, and recovering the desired 1,2-ditolylethane.

A specific embodiment of the invention is found in a process for the preparation of 1,2-ditolylethane by condensing a molar excess of toluene with ethylene chlorhydrin in the presence of phosphoric acid at a temperature in the range of from about 50° to about 200° C., separating the resultant condensation product, further condensing said product with toluene in the presence of a Friedel-Crafts type catalyst, and recovering the desired 1,2-ditolylethane.

A more specific embodiment of the invention is found in a process for the preparation of p,p'-1,2-ditolylethane by condensing a molar excess of toluene with ethylene chlorhydrin in the presence of phosphoric acid at a temperature in the range of from about 50° to about 200° C., separating the resultant p-(2-chloroethyl)toluene, condensing said p-(2-chloroethyl)toluene with a molar excess of toluene in the presence of aluminum chloride and recovering the desired p,p'-1,2-ditolylethane.

Yet another embodiment of the present invention resides in a process for the preparation of p,p'-1,2-ditolylethane which comprises condensing a molar excess of toluene with ethylene chlorhydrin in the presence of an acid-acting metal halide at a temperature in the range of from about 50° to about 200° C., and recovering the resultant p,p'-1,2-ditolylethane.

Other objects and embodiments referring to alternative acidic condensation catalysts and to alternative Friedel-Crafts type catalysts will be found in the following further detailed description of the invention.

It is now proposed that p,p'-1,2-ditolylethane which can be converted to p-xylene or directly oxidized to terephthalic acid may be prepared by condensing toluene with ethylene chlorhydrin. In the preferred embodiment of this invention the toluene which is condensed with the ethylene chlorhydrin is present in a molar excess over the ethylene chlorhydrin. The condensation of the toluene and the ethylene chlorhydrin takes place in the presence of an acidic condensation catalyst, said catalyst including, for example, hydrogen fluoride, boron trifluoride, sulfuric acid, phosphoric acid, alkane sulfonic acids such as methylsulfonic acid, ethylsulfonic acid, arylsulfonic acids such as phenylsulfonic acid, toluenesulfonic acid, and the like. This condensation reaction takes place at temperatures in the range of from about 50° to about 200° C., and preferably at the reflux temperature of toluene (105° to 110° C.) if toluene is the lowest component present.

The primary condensation product comprising p-(2-chloroethyl)toluene is separated from the catalyst and condensed with a second mole of toluene, in the presence of the excess toluene and an acid-acting Friedel-Crafts type metal halide catalyst. Examples of such metal halide catalysts include aluminum chloride, aluminum bromide, boron trifluoride, ferric chloride, zinc chloride, and the like. This reaction also takes place at temperatures in the range of from about 50° to about 200° C., preferably in a range of from about 75° to about 115° C. It is also contemplated within the scope of this invention that by the use of greater quantities of such catalyst, ethylene chlorhydrin may be condensed directly with 2 mols of toluene.

The process of this invention may be effected in any suitable manner and may comprise either a batch or continuous type operation. When a batch type operation is used for the two-step condensation, a quantity of the starting materials, namely the toluene and ethylene chlorhydrin are placed in a suitable condensation apparatus containing the acidic condensation catalyst. The vessel is then heated to the desired temperature and maintained thereat for a predetermined residence time after which the vessel and contents thereof are cooled to room temperature and the intermediate product p-(2-chloroethyl) toluene and excess toluene are separated from the catalyst. The former two compounds are then placed in a second condensation vessel or returned to the first condensation vessel, and enough toluene is then added to maintain the excess of said toluene over the intermediate product. The vessel is then heated to the desired condensation temperature and maintained thereat for a second condensation period after which time the vessel and contents thereof are again cooled to room temperature and the desired condensation product comprising 1,2-ditolylethane is separated from unreacted starting materials and catalysts and purified by conventional means, for example, fractional distillation, crystallization, etc.

Another method of preparing the desired 1,2-ditolylethane comprises a continuous type of operation. In this process the starting materials, namely, the toluene and ethylene chlorhydrin are continuously introduced to a condensation vessel maintained at suitable operating conditions of temperature and pressure. The toluene and ethylene chlorhydrin may be introduced through separate lines or may be admixed prior to introduction and continuously charged through a single line. The desired acidic condensation catalyst is also charged to this vessel through separate means. The condensation vessel may comprise an unpacked vessel or coil, or may contain an adsorbent inert packing material such as alumina, fire brick, dehydrated bauxite and the like. In the two-step process, after a predetermined residence time the intermediate product comprising p-(2-chloroethyl)toluene, together with unconverted toluene, are continuously withdrawn and charged to a second condensation vessel containing the Friedel-Crafts type metal halide catalyst. Additional toluene may also be introduced into this second reactor through separate means, or admixed with the stream of intermediate products prior to introduction into said second reactor. This second reactor is also maintained at proper operating conditions of temperature and pressure. After a predetermined residence time has elapsed the desired product comprising 1,2-ditolylethane is continuously withdrawn and separated from any unreacted intermediate p-(2-chloroethyl)toluene and toluene, and purified by conventional means hereinbefore set forth, the latter two compounds being recycled as a portion of the feed stock.

As hereinbefore stated, it is also contemplated within the scope of this invention that p,p'-1,2-ditolylethane may be prepared in a single stage reaction. In a continuous type operation this may be accomplished by continuously introducing the starting materials, that is, an excess of toluene and the chlorhydrin to a reactor of the type previously described containing an acid-acting Friedel-Crafts metal halide catalyst, and continuously withdrawing the reaction product after the required residence time has elapsed. The product may then be purified by conventional means while the unreacted materials are recycled as a portion of the feed stock.

By regulating the Friedel-Crafts type catalyst and correlating the type and amount of catalyst with the temperature and pressure it is possible to obtain good yields of p,p'-1,2-ditolylethane with a corresponding minimum amount of the possible contaminants, isomeric 1,2-ditolylethanes. However, the pressure of isomers containing no m-tolyl groups is tolerable inasmuch as the impurity may be separated from the desired reaction product after oxidation. This is possible due to the fact that the ortho isomer oxidizes to form phthalic acid which is easily separable by sublimation from the terephthalic acid formed from oxidation of p,p'-1,2-ditolylethane.

The following examples are given to illustrate the process of the invention which, however, are not intended to limit the generally broad scope of the present invention in strict accordance therewith.

Example I 920 g. of toluene and 80.5 g. of ethylene chlorhydrin are placed in a condensation flask along with 250 g. of 85% phosphoric acid. The flask is then heated to a temperature of approximately 110° C. and maintained thereat for a period of approximately 22 hours. At the end of this time the flask and contents thereof are allowed to cool to room temperature and the p-(2-chloroethyl)-toluene and excess toluene are separated from the phosphoric acid, washed, and dried. The former two compounds are placed in a second condensation flask along with 45 g. of aluminum chloride and an additional 92 g. of toluene. This flask is then heated to about 60° C. and maintained thereat for a period of approximately 3 hours. At the end of this time the flask and contents thereof are again allowed to cool to room temperature and the reaction product comprising 1,2-ditolylethane is separated from the unreacted toluene and p-(2-chloroethyl)toluene.

Example II 1100 g. of toluene and 80.5 g. of ethylene chlorhydrin are condensed in the presence of 200 g. of toluenesulfonic acid under conditions similar to that set forth in Example I above. The intermediate product and the excess toluene are separated from the catalyst and placed in a stirred steel autoclave along with 40 g. of boron trifluoride. The p-(2-chloroethyl)toluene is condensed with the excess of toluene in the presence of boron trifluoride, under conditions again similar to those set forth in Example I above.

The reaction product comprising 1,2-ditolylethane is separated from the unreacted intermediate product and toluene and purified by fractional distillation. The fraction boiling 170–180° (15 mm. pressure), after recrystallization from alcohol, melts at 83–85°, and is identified as p,p'-1,2-ditolylethane.

We claim as our invention:

1. A process for the preparation of 1,2-ditolylethane which comprises condensing toluene with ethylene chlorhydrin, said toluene being present in a molar excess over said ethylene chlorhydrin, in the presence of a molar excess of phosphoric acid catalyst over said ethylene chlorhydrin at a temperature in the range of from about 50° to about 200° C., separating the resultant condensation product, further condensing said product with toluene in the presence of a Friedel-Crafts type catalyst, and recovering the desired 1,2-ditolylethane.

2. A process for the preparation of 1,2-ditolylethane which comprises condensing toluene with ethylene chlorhydrin, said toluene being present in a molar excess over said ethylene chlorhydrin, in the presence of a molar excess of a phosphoric acid catalyst over said ethylene chlorhydrin at a temperature in the range of from about 105° to about 115° C., separating the resultant condensation product, further condensing said product with toluene in the presence of aluminum chloride, and recovering the desired 1,2-ditolylethane.

3. A process for the preparation of 1,2-ditolylethane which comprises condensing toluene with ethylene chlorhydrin, said toluene being present in a molar excess over said ethylene chlorhydrin, in the presence of a molar excess of a phosphoric acid catalyst over said ethylene chlorhydrin at a temperature in the range of from about 105° to about 115° C., separating the resultant condensation product, further condensing said product with toluene in the presence of boron trifluoride, and recovering the desired 1,2-ditolylethane.

4. A process for the preparation of p,p'-1,2-ditolylethane which comprises condensing toluene with ethylene chlorhydrin, said toluene being present in a molar excess over said ethylene chlorhydrin, in the presence of a molar excess of phosphoric acid over said ethylene chlorhydrin at a temperature in the range of from about 105° to about 115° C., separating the resultant p-(2-chloroethyl)toluene, condensing said p-(2-chloroethyl)toluene with a molar excess of toluene over said p-(2-chloroethyl)toluene, in the presence of aluminum chloride, and recovering p,p'-1,2-ditolylethane.

5. A process for the preparation of p,p'-1,2-ditolylethane which comprises condensing toluene with ethylene chlorhydrin, said toluene being present in a molar excess over said ethylene chlorhydrin, in the presence of a molar excess of phosphoric acid over said ethylene chlorhydrin at a temperature in the range of from about 105° to about 115° C., separating the resultant p-(2-chloroethyl)toluene, condensing said p-(2-chloroethyl)toluene with a molar excess of toluene over said p-(2-chloroethyl)toluene in the presence of aluminum chloride at a temperature in the range of from about 50° to about 200° C., and recovering p,p'-1,2-ditolylethane.

References Cited in the file of this patent

UNITED STATES PATENTS 2,744,150     Enos _____ May 1, 1956

FOREIGN PATENTS 354,992     Great Britain _____ Aug. 10, 1931